No. 744,178. PATENTED NOV. 17, 1903.
C. A. DRESSER.
CONTROLLING DEVICE FOR MOTORS.
APPLICATION FILED JUNE 19, 1902.
NO MODEL. 6 SHEETS—SHEET 1.

Fig. 1.

Witnesses.
Edward T. Wray
Homer T. Kraft

Inventor,
Charles A. Dresser.
by Parker Carter
Attorneys.

No. 744,178. PATENTED NOV. 17, 1903.
C. A. DRESSER.
CONTROLLING DEVICE FOR MOTORS.
APPLICATION FILED JUNE 19, 1902.
NO MODEL. 6 SHEETS—SHEET 2.

Witnesses.
Edward T. Wray

Inventor.
Charles A. Dresser.
by Parker & Carter
Attorneys.

No. 744,178. PATENTED NOV. 17, 1903.
C. A. DRESSER.
CONTROLLING DEVICE FOR MOTORS.
APPLICATION FILED JUNE 19, 1902.
NO MODEL. 6 SHEETS—SHEET 3.

Witnesses.
Edward T. Wray
Homer L. Krafft

Inventor.
Charles A. Dresser,
by Parker & Carter
Attorneys.

No. 744,178. PATENTED NOV. 17, 1903.
C. A. DRESSER.
CONTROLLING DEVICE FOR MOTORS.
APPLICATION FILED JUNE 19, 1902.
NO MODEL. 6 SHEETS—SHEET 4.

Witnesses.
Edward T. Wray.
Homer L. Kraft.

Inventor.
Charles A. Dresser.
by Parker & Burton
Attorneys.

No. 744,178. PATENTED NOV. 17, 1903.
C. A. DRESSER.
CONTROLLING DEVICE FOR MOTORS.
APPLICATION FILED JUNE 19, 1902.
NO MODEL. 6 SHEETS—SHEET 5.

Witnesses.
Edward T. Wray.
Homer L. Krafft

Inventor.
Charles A. Dresser.
by Parker & Carter
Attorneys.

No. 744,178. PATENTED NOV. 17, 1903.
C. A. DRESSER.
CONTROLLING DEVICE FOR MOTORS.
APPLICATION FILED JUNE 19, 1902.
NO MODEL. 6 SHEETS—SHEET 6.

Witnesses.
Edward T. Wray.
Homer L. Kraft.

Inventor.
Charles A. Dresser,
by Parker T. Carter
Attorneys.

No. 744,178.                                                    Patented November 17, 1903.

UNITED STATES PATENT OFFICE.

CHARLES A. DRESSER, OF CHICAGO, ILLINOIS, ASSIGNOR TO G. A. EDWARD KOHLER AND FRANKLIN W. KOHLER, OF CHICAGO, ILLINOIS.

CONTROLLING DEVICE FOR MOTORS.

SPECIFICATION forming part of Letters Patent No. 744,178, dated November 17, 1903.

Application filed June 19, 1902. Serial No. 112,335. (No model.)

*To all whom it may concern:*

Be it known that I, CHARLES A. DRESSER, a citizen of the United States, residing at Chicago, in the county of Cook and State of Illinois, have invented a certain new and useful Improvement in Controlling Devices for Motors, of which the following is a specification.

My invention relates to controlling devices for electric motors, and has for its object to provide a new and improved device of this description.

My invention is illustrated in the accompanying drawings, wherein—

Like characters refer to like parts throughout the several figures.

My present invention relates to a controlling mechanism, preferably automatic, for two or more electric motors, and is particularly adapted to an arrangement where two or more electric motors are successively connected to a driving mechanism.

I have illustrated my invention in connection with electric motors particularly adapted to operate such devices as printing-presses, wherein certain conditions are met which require complete automatic control of the parts, together with perfect reliablity and action.

In starting up a printing-press, for example, it is necessary to first run the press at a slow rate of speed, and particularly when the paper is being threaded into the press, and it must also be started with great steadiness and a uniform and smooth acceleration of the speed obtained to prevent tearing the paper. The press must also be under perfect control, so that it can be started and moved a small amount and then stopped at particular points. It is also desirable to have an emergency stop by means of which the press can be instantly stopped, if desired. These and other conditions, which I will not stop to enumerate, indicate the necessity for a perfect control of the operating mechanism of the press.

While the construction herein shown, as before stated, may be used with any desired driven mechanism, for the purpose of explanation I will consider it as used with an octuple or sextuple printing-press.

Figures 16, 17, 18, 19, 20:
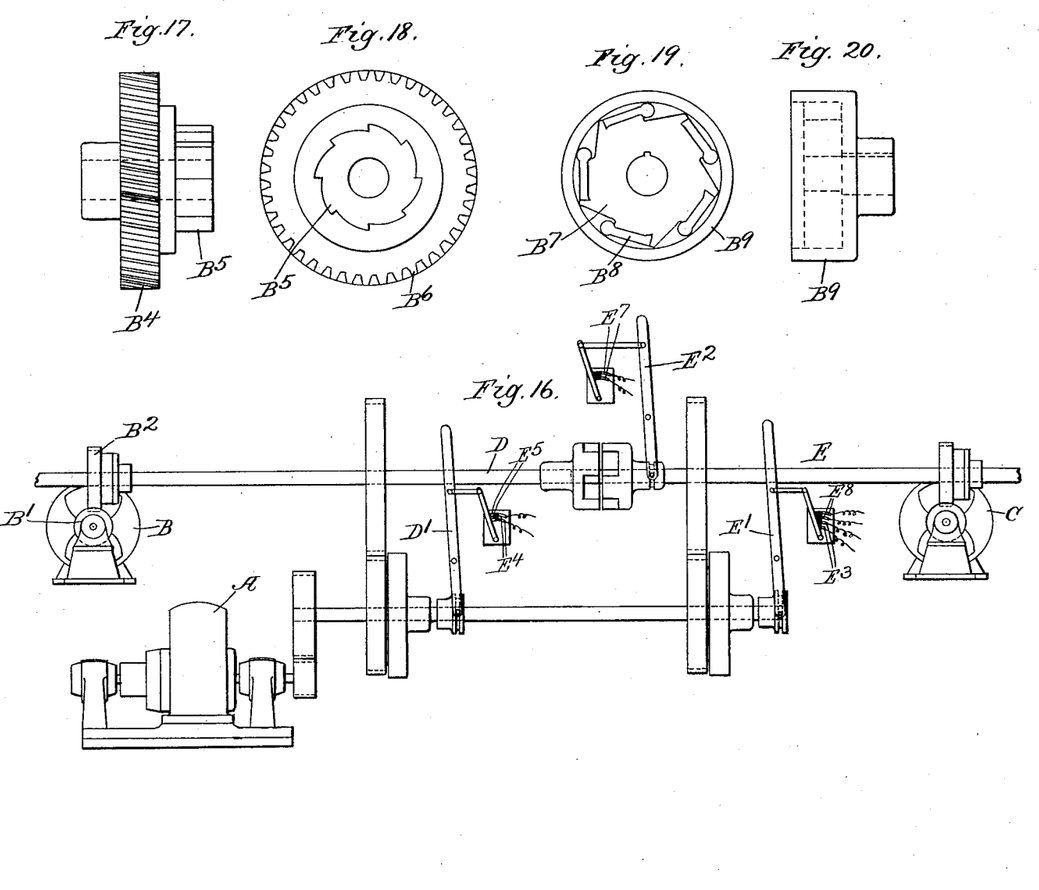
Fig. 16 is a diagrammatic view showing the various motors and means for connecting them to the driving-shaft for the operated mechanism.
Figs. 17, 18, 19, and 20 are views of the automatic clutch associated with the driving-shaft.

Referring now to Fig. 16, I have shown three motors A, B, and C, adapted to be connected to a driving-shaft for the mechanism, and when this driving-shaft operates, for example, a sextuple press I prefer to divide it, as shown, into two shafts D and E, adapted to be connected by a suitable clutch mechanism, so as to form one continuous shaft. The motor B, for example, is connected to the shaft D by a slow-motion gearing, which may be of any desired construction—such, for example, as the worm B' and worm-gear B². This slow-motion gearing permits the motor B to readily start the shaft D and also permits said machine to easily and quickly attain its full speed and also allows the shaft D to be run at a slow rate of speed. The motor A, which when used with printing-presses is larger than the motor B, is adapted to be connected with the shaft D by any suitable connecting mechanism. When the motor B is started up, it starts shaft D and rotates it at a comparatively slow rate of speed, at the same time setting the armature of motor A in motion. If now the circuit is completed through motor A, it will be started up and will rotate the shaft D at a higher rate of speed. An automatic clutch mechanism is provided by means of which the motor B is automatically disconnected from shaft D when the motor A is carrying the load. Any suitable construction for this purpose may be used.

The motor C, which is similar to motor B, is connected by the slow-motion gearing with the shaft E, and this shaft is also in connection with the armature of motor A, said connection being controlled by a lever E', which operates a suitable clutch mechanism. The connection between the shaft D and the armature of motor A is controlled by the lever D', while the clutch which connects the shafts D and E is controlled by the lever $E^2$. It will be seen that by this arrangement the mechanism operated by shaft D can be started up slowly with motor B and can then be driven at a high speed or normal speed by the motor A, while the mechanism connected with the shaft E may be during this time driven slowly by the motor C. It will further be seen that both mechanisms connected with shafts D and E may be started up slowly by either motor B or C if they are connected by the clutch controlled by lever $E^2$ and that this entire mechanism can then be driven at a high rate of speed by the motor A. Also motor A may be connected to either shaft D or E.

Figure 1:
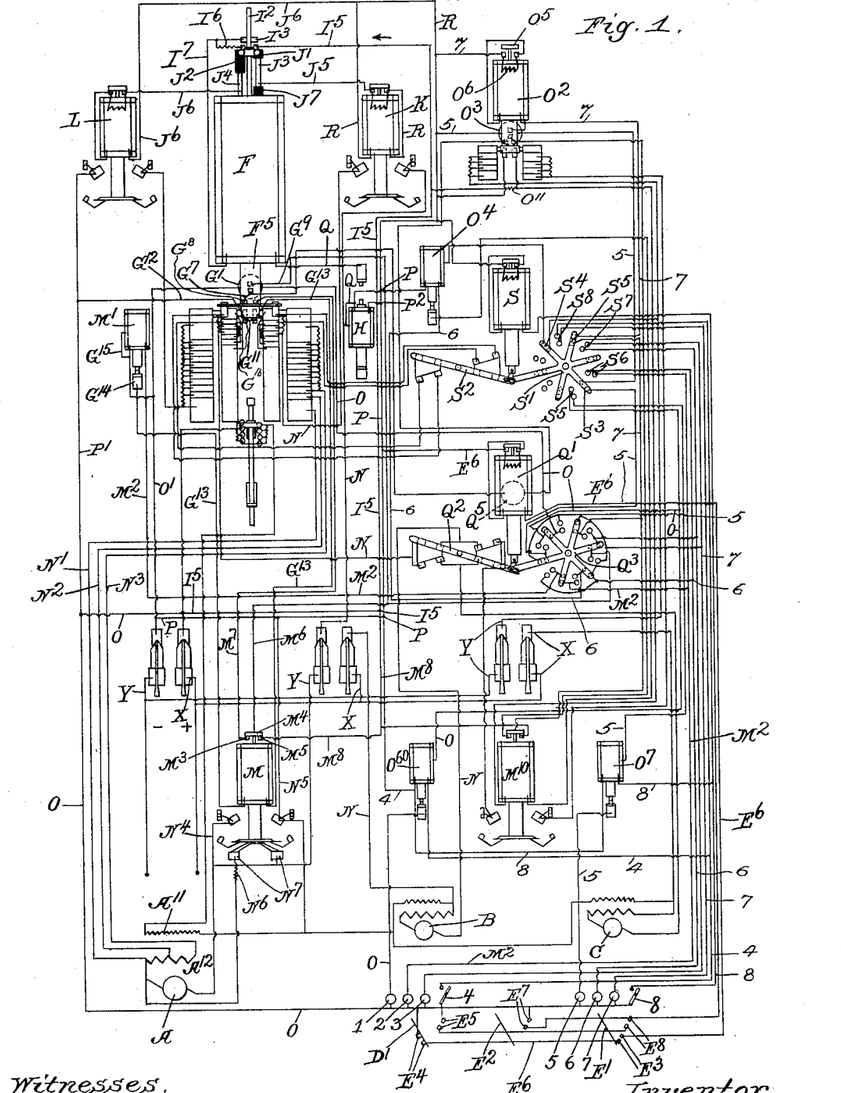
Figure 1 is a diagrammatic view showing the circuits of a system embodying my invention.
Figure 2:
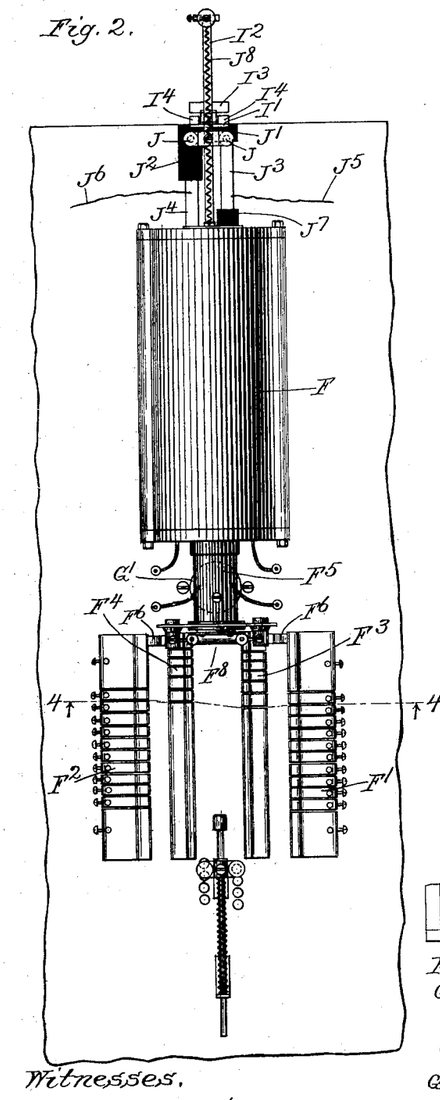
Fig. 2 is a front view of the double controller.
Figures 3, 21:
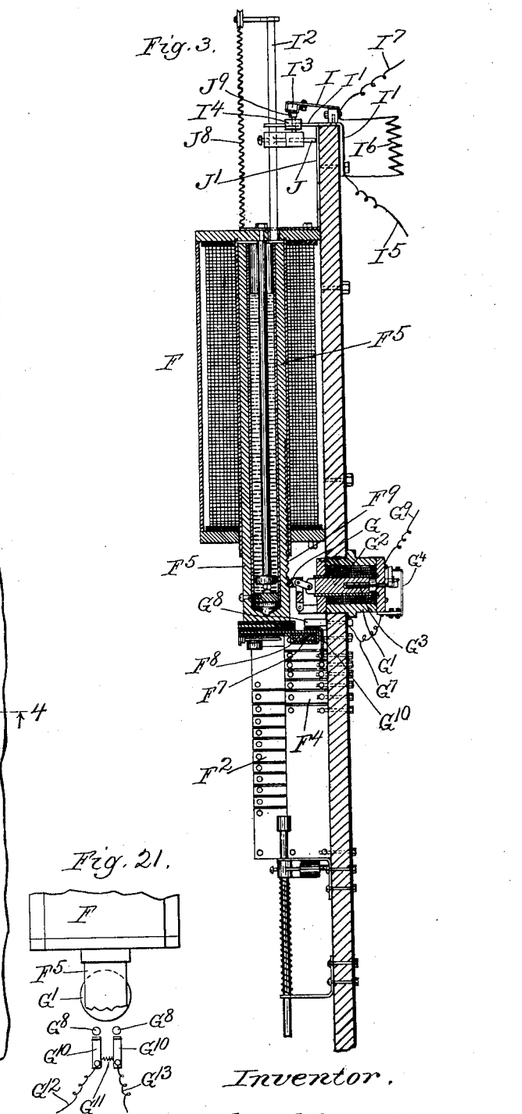
Fig. 3 is a longitudinal section therethrough.
Fig. 21 is a front view with parts broken away, showing the contacts which are controlled by the brush device connected with the end of the main solenoid-core.
Figure 4:
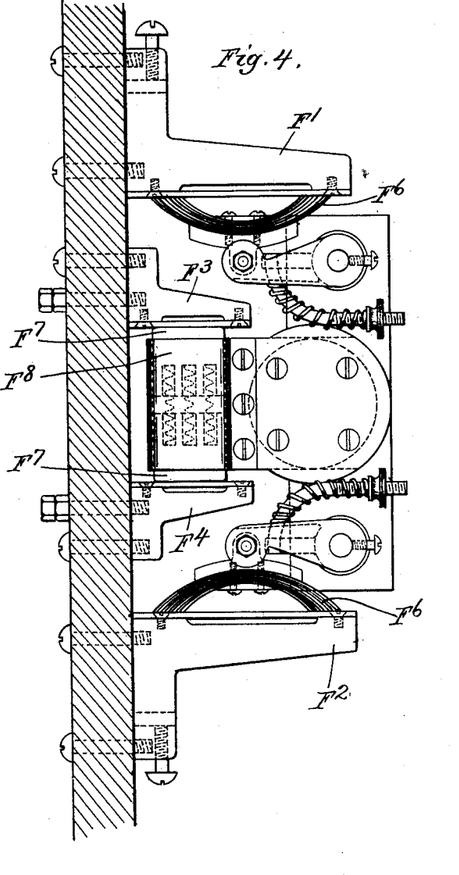
Fig. 4 is a section on line 4 4, Fig. 2.
Figure 5:
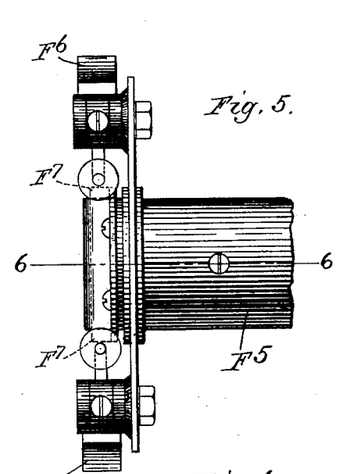
Fig. 5 is a view of the end of the core of the solenoid shown in Fig. 2.
Figure 6:
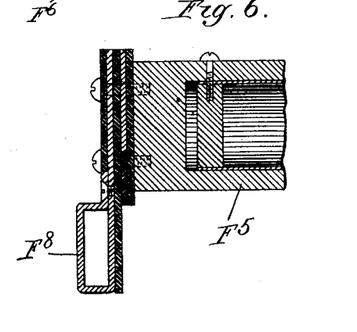
Fig. 6 is a section on line 6 6, Fig. 5.
Figure 7:
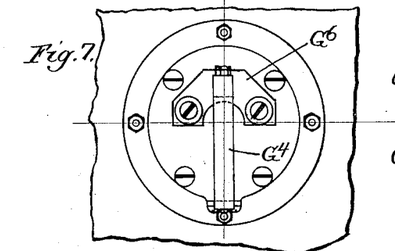
Fig. 7 is an end view of the holding-magnet for the core of the large solenoid.
Figure 8:
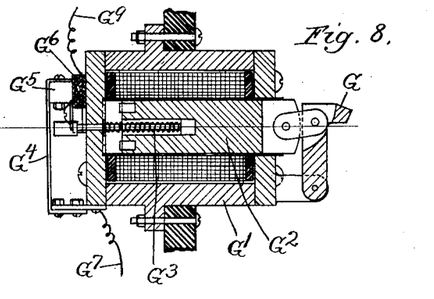
Fig. 8 is a longitudinal section therethrough.
Figure 9:
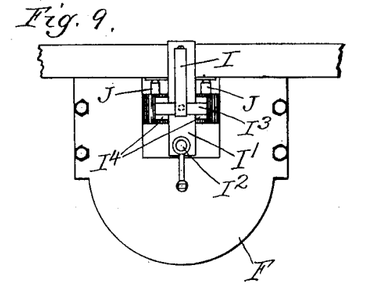
Fig. 9 is a plan view of the large solenoid, showing the switch at the top.
Figure 10:
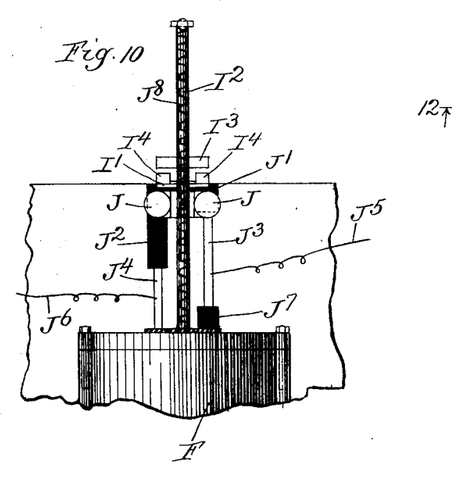
Fig. 10 is an enlarged front view showing this switch.
Figure 11:
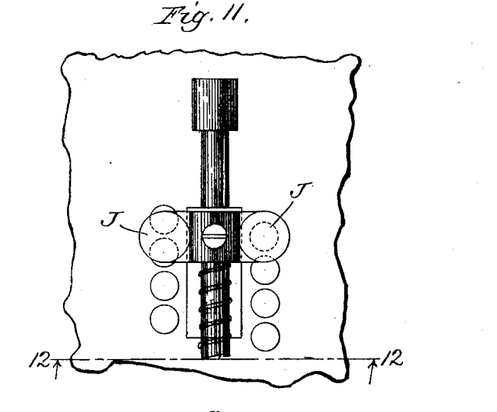
Fig. 11 is an enlarged view showing the field-resistance contact at the bottom of the large solenoid.
Figure 12:
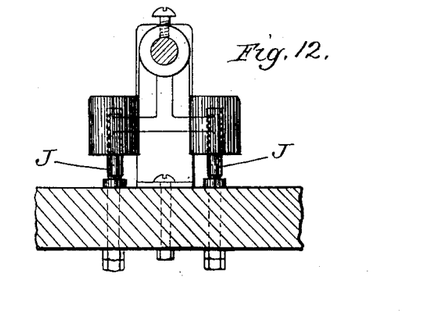
Fig. 12 is a section on line 12 12, Fig. 11.

Referring now to Fig. 1, wherein I have shown diagrammatically the devices and electrical connections for controlling the motors, I will explain briefly the various functions of the several parts. The motors A and B are provided with suitable controllers consisting of contacts and resistances associated together and contact devices therefor operated by a solenoid F. The construction of these parts is illustrated in Figs. 2 and 3. The contacts F' and $F^2$ are associated with the resistances adapted to be used with the motor A, while the contacts $F^3$ and $F^4$ are associated with the resistances adapted to be used with the motor B. The contact devices consist of suitable parts connected with the core $F^5$ of the solenoid F and adapted to connect the contacts F' and $F^2$ and $F^3$ and $F^4$, the two sets of contacts being independent of each other. Attached to the end of the core $F^5$ are two brushes $F^6$, which are connected to suitable supports and which are electrically connected together, so that the circuit is completed between the two opposed contacts F' and $F^2$, which these brushes touch. Attached to the end of this core are two more brushes $F^7$, supported by a brush-holder $F^8$, which is a conductor, so that the circuit is completed between the two opposed contacts $F^3$ and $F^4$, engaged by these brushes. Both sets of brushes are elastically pressed toward the contacts along which they pass. The resistances are connected with the various contacts, so as to be cut out of the circuit as the core of solenoid F drops, and this core is preferably arranged to drop by gravity. Said core is provided with a suitable locking or holding device for holding it in any intermediate position. As herein illustrated, this result is produced by forming the core with a series of projections $F^9$ and providing a suitable engaging part G, which engages these projections, so as to hold the core in the desired position. Any suitable construction for this purpose may be used, and, as herein shown, I have provided a solenoid or magnet G', having a core $G^2$, to which the engaging device G is attached. This core is normally pressed toward the core $F^5$ by a spring $G^3$ and is retracted when the magnet is energized, so as to release the core $F^5$. At the rear of the magnet G' is a switch device adapted to be open when the magnet energizes its core, so as to release the core $F^5$. This switch consists of a spring member $G^4$, provided with a contact $G^5$, opposed to the contact $G^6$. A conductor $G^7$ leads from the contact $G^8$ to the spring member $G^4$, and a conductor $G^9$ leads to the solenoid H. When the core $G^2$ is attracted, the contacts $G^5$ $G^6$ are separated, so as to break the circuit through the solenoid H. The magnet G' is connected by a conductor O to switch $Q^3$, and thence to solenoid $O^{60}$, and thence to push-button or switch 1 and terminal X, and to terminal Y by conductor O'.

Associated with each contact $G^8$ is a spring-contact $G^{10}$. These spring-contacts are normally out of contact with the contacts $G^8$, Fig. 3, but are brought into contact therewith by engagement with a part on the core of solenoid F when said core is in its initial position. Under these conditions the contacts $G^{10}$ make engagement with contacts $G^8$; but there is no cross connection made between the two contacts $G^{10}$ or the two contacts $G^8$. Between the spring-contacts $G^{10}$ is the resistance $G^{11}$, adapted to be inserted in the circuit of the emergency-solenoid M when the core of solenoid F is moved from its initial position and to be short-circuited when the core of solenoid F is up and the core of solenoid M is down by the contacts $G^8$ and $G^{10}$. One contact $G^{10}$ is connected by conductor $G^{12}$ with the terminal X and by conductor $G^{13}$ with the solenoid M, which solenoid is connected to contact $G^{14}$, associated with the core of solenoid M', and thence by conductors $G^{15}$ and O' to the other terminal, Y. The solenoid M' is connected to the emergency push-button or switch 2 by conductor $M^2$ and to terminal Y by conductor O'.

The emergency-solenoid M is provided at the top with a switch consisting of the parts $M^3$, $M^4$, and $M^5$. $M^4$ is connected to conductor $P^2$, leading to solenoid H, by conductor $M^6$; $M^3$ to contact $G^8$, associated with the core of solenoid F, by conductor $M^7$, and $M^5$ by conductor $M^8$ to conductor O, leading to the terminal X. When the core of M is down, the three contacts are together and the circuit through H is completed, while the circuit through M passes around the resistance $G^{11}$. When the core of solenoid M is fully drawn up, the contact $M^4$ is lifted and the circuit broken. This breaks this circuit through solenoid H; but the original circuit is now completed through said solenoid by the switch associated with the core of solenoid F, because said core is now in its up or initial position. The short circuit around the resistance $G^{11}$ is now broken, and the circuit through M passes through said resistance. The circuit through solenoid H is from terminal X through conductors $P'$, $G^{12}$, $G^9$, solenoid H, and conductor P to terminal Y.

The solenoid F is provided at its top with a switch, by means of which some of the circuits are controlled. This switch consists of a spring-piece I, Figs. 2 and 3, attached to a piece of insulating material and fastened to the guide-piece $I'$, which guides the rod $I^2$, normally resting on the core $F^5$ of solenoid F. The piece I is provided with a carbon contact $I^3$, adapted to engage the opposed contacts $I^4$, electrically connected together and attached to the guide-piece $I'$, which makes contact with the rod $I^2$. A conductor $I^5$ is connected with one of the terminals or mains X and is also electrically connected with the guide-piece $I'$. Resistance $I^6$ is connected with the guide-piece $I'$ and also with the spring I, and a conductor $I^7$ leads from spring I to the coil of solenoid F. The rod $I^2$ carries two brushes J, one of which initially rests upon the insulating-piece $J'$ and the other upon the insulating-piece $J^2$ when the core of the solenoid is in its maximum upward position. Suitable contact-pieces $J^3$ $J^4$ are positioned to be engaged by these brushes in their downward travel. The contact $J^3$ is connected by conductor $J^5$ with the solenoid K, while the contact $J^4$ is connected by conductor $J^6$ with the solenoid L. When the core of solenoid F is at its lowest position, one of the brushes $J'$ engages the insulating-piece $J^7$. The rod $I^2$ is provided with a spring or other elastic device $J^8$, which causes it to follow the core of the solenoid as said core lowers. When the core of solenoid F is at its maximum upward position, the resistance $I^6$ is cut in the circuit of the solenoid F and reduces the current, so that while it is sufficient to hold the core it would not be sufficient to draw the core up. As the core lowers, the pin $J^9$, Fig. 3, is lowered, permitting the contact $I^3$ to engage the contacts $I^4$, thus short-circuiting the resistance $I^6$.

The circuit through solenoid F is from terminal X through conductor $I^5$ to switch at top of solenoid F, thence by conductor $I^7$ through coil of the solenoid, thence by conductors Q and P to terminal Y. The circuit through solenoid K is from terminal X through conductor $I^5$ to switch at top of solenoid F, thence through conductor $J^5$, when the switch is in right position, thence through solenoid K, thence by conductors R and P to terminal Y. The circuit through solenoid L is from terminal X through conductor $I^5$ to switch at top of solenoid F, thence by conductor $J^6$ to solenoid L, thence by conductors $J^6$, R, and P to terminal Y.

The solenoid K completes the circuit through motor B, traced as follows: from terminal X of the middle switch and conductor N to motor, thence by conductor N to switch $Q^2$, thence by conductor N to resistance associated with solenoid F, thence by conductor N to switch controlled by solenoid K, and thence to the left side of the middle switch, and thence by conductor Y to conductor $N^4$, and thence across the terminal of the switch closed by the core of solenoid M, which at this time is up, to conductor $N^5$, and thence to terminal Y.

The circuit through motor A is completed by the lifting of the core of solenoid L and is traced as follows: from terminal X by conductors O and $P'$ to switch associated with solenoid L, thence to resistance, thence by either conductor $N'$, $N^2$, or $N^3$ to motor A, thence by conductor $N^4$ to switch controlled by emergency-solenoid M, and thence by conductor $N^5$ to terminal Y. When the core of emergency-solenoid is down, the circuit through motor A is broken and the armature is short-circuited across contacts $N^7$ and through resistance $N^6$.

The motor C when in circuit with the controller operated by the solenoid $O^2$ is operated by the push-buttons or switches 5, 6, and 7. When this circuit is closed at 5, a circuit is completed through a magnet $O^3$, (similar to $G'$,) which holds the core of solenoid $O^2$, and said core is released, so as to permit the core to drop to cut resistance out of the motor-circuit to properly start the motor. When it is desired to stop the motor C, push-button or switch 7 is actuated, which completes the circuit through $O^2$ and causes it to draw up its core. Solenoid $M^{10}$ is the emergency-solenoid for motor C, and the circuit through it is broken by solenoid $O^4$, actuated on switch or push-button 6, as before described with relation to the motors A and B. I have not described these circuits in detail, as they will be readily understood in view of the foregoing explanation.

The solenoid $O^2$ is provided at the back with a switch device similar to that described with relation to solenoid F. When the core of solenoid $O^2$ is up, the contact $O^5$ is lifted and a resistance $O^6$ is interposed in the solenoid-circuit similar to the resistance $I^6$ of solenoid F. A similar switch and resistance are associated with the solenoids K, L, S, and $Q'$.

Some suitable safety device is provided, so as to prevent the motors from being started up if not running and to prevent the speed from being increased if running.

Referring now to motors A and B, it will be noted that the circuit leading from push-button 1 to the locking and releasing magnet G' passes through the core of solenoid $O^{60}$. The circuit through this solenoid is controlled by switch 4. When this switch is closed, the circuit is completed and the core of solenoid $O^{60}$ is drawn up, so as to break the circuit through magnet G', and the core of solenoid F cannot then be released. Solenoid $O^7$ breaks the circuit through magnet $O^3$ when switch 8 is closed and prevents the controller from being operated.

Figures 13, 14:
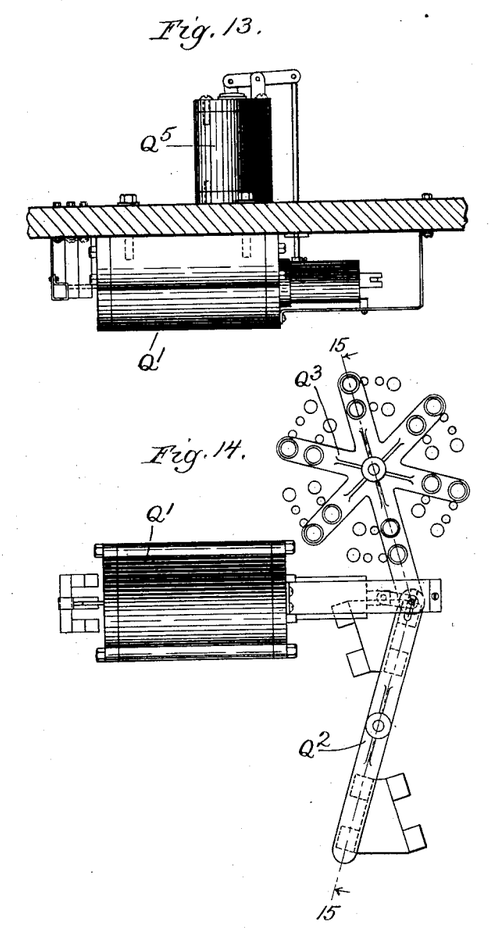
Fig. 13 is a view of the safety device for preventing the idle motor from being connected in circuit without resistance.
Fig. 14 is a front view of the switch controlled by the safety device.
Figure 15:
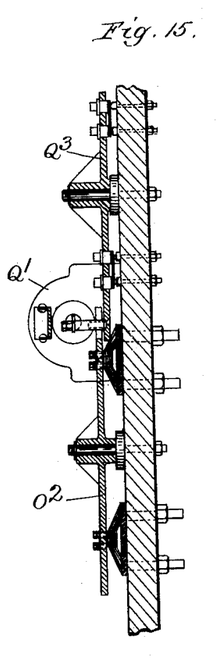
Fig. 15 is a section on line 15 15, Fig. 14.

Some means is provided for controlling motor A when connected with shaft E, driving it at a high speed and D at a low speed. This is done in the drawings through the agency of the switches $Q^2$ and $Q^3$, controlled by solenoid Q'. When the parts are in the position shown in Fig. 1, the motors A and B are associated together and are connected to the controller of solenoid F. If now lever E' is moved to the right, so as to connect contacts $E^3$, a circuit is completed through solenoid Q' from conductor O, connected to terminal X, through conductor $E^6$ to solenoid Q', then by conductor $E^6$ to conductor P, thence to terminal Y. The core of solenoid Q' is then lifted and the switches $Q^2$ and $Q^3$ shifted. The movement of switch $Q^2$ connects motor B with the controller on the right operated by solenoid $O^2$ and at the same time connects the motor C with the controller operated by solenoid F. The movement of switch $Q^3$ changes the circuits of the push-buttons, so the push-buttons 5, 6, and 7, &c., are associated with the controller of solenoid F, and push-buttons 1 2 3, &c., are associated with the controller of solenoid $O^2$. I have not described these circuits in detail, as the operation of the switches will be readily seen from the foregoing explanation. The switches $Q^2$ and $Q^3$ are shown in Figs. 13, 14, and 15.

The switch $Q^2$ should never be moved when either of the motors is in operation, for if moved then the circuit will be completed through one of the motors B or C while at a standstill and while the resistance of the controller is all or partly out of circuit. A safety device is therefore arranged for preventing this and consists of a locking-magnet $Q^5$, associated with the core of solenoid Q'. This magnet when energized releases the core of solenoid Q' and when deënergized locks said core, so it cannot be moved. The circuit through this magnet $Q^5$ is completed when the cores of solenoids F and $O^2$ are both up and is broken when either of said cores is moved from its initial position. It will therefore be seen that when either small motor is operating the core of solenoid Q' is locked and the switch $Q^2$ cannot be moved by completing the circuit through the solenoid. This circuit through magnet $Q^5$ is completed by the contacts $G^8$ and $G^{10}$, associated with the core of solenoid F, and also by similar contacts associated with solenoid $O^2$.

The switch S', controlled by solenoid S, connects both sets of push-buttons in parallel when moved by the lifting of the core of solenoid S and also opens the circuit of the "on" or starting magnet $O^3$ at $S^3$ and the circuit of the "off" or slow-stopping solenoid $O^2$ at $S^5$ and the circuit of the emergency-solenoid $M^{10}$ at $S^4$. This permanently cuts out the controller of solenoid $O^4$, and hence the motor associated therewith.

The push-button circuits are connected together or paralleled at $S^5$, $S^6$, and $S^7$ and the safety switch-circuits are connected or paralleled at $S^8$. It will therefore be seen that the motors and controllers associated with solenoid F may be operated from either set of push-buttons or switches.

The switch $S^2$ when moved upward by solenoid S short-circuits a portion of the resistance of the small motor, which now carries the load on both shafts D and E. The lever D' has associated with it contacts $E^4$, associated with the circuit of solenoid Q', and contacts $E^5$, associated with the circuit of solenoid S. Associated with the lever $E^2$ are contacts $E^7$, associated with the circuit of solenoid S. Lever E' controls contacts $E^3$, associated with the circuit of solenoid Q', and contacts $E^8$, associated with the circuit of solenoid S.

I have described in detail the various parts shown in the drawings for carrying out my invention; but it is of course evident that these parts may be greatly varied and that some may be omitted and others used with parts not herein shown without departing from the spirit of my invention. I have shown most of these parts diagrammatically, so that my invention may be more readily understood. When I use the term "push-button" I mean to include any kind of a circuit making and breaking device.

The use and operation of my invention are as follows:

As before stated, my invention may be used in connection with any suitable driven mechanism and may be arranged in any desired relation thereto.

For purposes of explanation I will describe briefly the operation of my invention when the shafts D and E are connected to or are parts of an octuple printing-press.

When it is desired to run the left side of the press at high speed, the push-button 1 of the left-hand series is pushed. The magnet G' is then energized so as to attract its armature and release the core of the large solenoid. The movement of the armature of the magnet G' breaks the circuit through the solenoid H and the core of said solenoid falls, breaking the circuit through the large solenoid. When the core of the large solenoid F is up, a sufficient amount of current is permitted to leak through it by means of interposed resistance to hold it up and the falling of the core of solenoid H breaks this circuit. The core of the large solenoid F is then moved—as, for example, by its own weight. The moving or lowering of the core of the solenoid F by means of the switch at the top next energizes solenoid K and causes it to move its core upward. This cuts the motor B in circuit. The further movement of the core of the solenoid F by means of the switch at the top completes the circuit through solenoid L and causes the core of said solenoid to be drawn up. This completes the circuit through the motor A. In the meantime the resistance has been cut out of the circuit of the motor B. The circuit through the motor A is now completed, and resistance is gradually cut out of the circuit. Resistance is now gradually cut in the circuit of motor B and said motor slowed down. The further lowering of the core of the large solenoid by means of the switch at the top cuts out solenoid K and causes its core to drop, thus breaking the circuit through the motor B, which comes to rest. The further lowering of the core of the large solenoid cuts out a part of the series field $A^{12}$ of the motor A, then all of said field, and then cuts in resistance in the shunt-field $A^{11}$ of the motor A. The large motor is now running at full speed and operating the press. When it is desired to stop the press, push-button 3 of the set on the left is pushed. This completes the circuit through solenoid H, and the core of said solenoid is drawn up. This completes the circuit through the solenoid F, which becomes energized and begins to draw up its core. The upward movement of this core first cuts out the resistance in the shunt-field of the motor A, then cuts in the series field of said motor. As the core moves up the switch at the top of the solenoid F completes the circuit through solenoid K, and its core is moved up to complete the circuit through the motor B, and said motor then starts up. The further upward movement of the core of solenoid F breaks the circuit through solenoid L, and its core drops, thus breaking the circuit through the motor A, which motor continues to revolve because of the motor B. The further upward movement of said core breaks the circuit through solenoid K and causes its core to drop, cutting out the motor B, which is brought to a stop, and the press is thus gradually brought to a standstill. During all this time the push-button 3 is being pressed. When the core of the solenoid F is completely up, a circuit is completed through solenoid H by the switch back of the core of the large solenoid and closed by said core when in its up position. If now the push-button 3 is released, the core of solenoid H still stays up, and a small amount of current is thus permitted to leak through the solenoid F, which although not sufficient to pull the core up is sufficient to hold it up, and thus prevent accidental dropping of the core in view of the failure of the locking device to properly operate.

When for any reason it is desired to stop the press instantly, the emergency push-button 2 is pressed. During the two operations above described the emergency-switch operated by solenoid M is closed, said solenoid being energized by the closing of the main switch. If now the emergency-button is pressed, a circuit is completed through solenoid M′, which becomes energized and lifts its core, thus breaking the circuit through solenoid M. The core of solenoid M then drops, breaking the circuit through both motors and short-circuiting the armature of motor A through a resistance, thus instantly stopping said motor and the press. The lowering of the core of solenoid M completes the circuit through solenoid H and causes it to lift its core, thus completing the circuit through the large solenoid F. When the core of solenoid F reaches its initial or maximum up position, it completes a circuit through solenoid M and causes said solenoid to lift its core, bringing the emergency-switch in proper relation to start the machine. Solenoid H therefore has different circuits for different occasions. When the core of solenoid F is down, the current through M passes through the resistance $G^{11}$, which is sufficient to hold its core up, but not sufficient to draw it up. When the core of solenoid F is in its up position, this resistance is short-circuited and the entire current then passes through solenoid M, said current being sufficient to draw its core up. When the core of solenoid M is drawn up, it modifies the circuit, so as to do away with the short circuit through the resistance $G^{11}$, thus again putting $G^{11}$ in circuit. This is done by the lifting of contact $M^4$.

When it is desired to run the right half of the press at slow speed either alone or while the other half of the press is running either at slow or high speed, the push-button 5 on the right is pressed. This completes the circuit through magnet $O^3$, causing said magnet to attract its armature and release the core of solenoid $O^2$. Said core then falls by gravity, cuts the small motor C in circuit, and then gradually cuts out the resistance. When it is desired to gradually stop this small motor, push-button 7 on the right is pressed. This closes the circuit through solenoid $O^2$ and causes it to lift its core, so as to cut resistance into the motor-circuit and finally cut the motor out of circuit. In view of the detailed description of the circuits of the push-buttons on the left I have not described in detail the circuits of the push-buttons 5, 6, 7, and 8, but have placed upon certain circuits at different points the figure corresponding to the push-button, so as to facilitate the tracing of the circuits.

When it is desired to suddenly stop the motor C, the button 6 on the right is pushed. This completes the circuit through solenoid $O^4$, causing it to lift its core, and breaks the circuit through solenoid $M^{10}$. The core of said latter solenoid then falls and opens the armature-circuit of the motor C, while the switch at the top closes the circuit through solenoid $O^2$. Said solenoid then draws up its core. When the core of solenoid $O^4$ is down, there is a resistance $O^{11}$ interposed in the circuit of solenoid $M^{10}$, and this resistance is so proportioned as to cut the current down, so that while it will hold the core of $M^{10}$ up it is not of sufficient strength to draw it up. When the core of solenoid $O^2$ reaches its upper position, it short-circuits this resistance, and thus the current through $M^{10}$ is sufficient to draw up its core. When the core of solenoid $O^2$ is down, the circuit through solenoid $M^{10}$ is from terminal X through conductor $I^5$ to resistance $O^{11}$, thence to solenoid $M^{10}$, thence to the core of solenoid $O^4$, thence to switch $S'$, and thence to terminal Y through the switch on the right. When the core of the solenoid $O^2$ is up and the core of solenoid $M^{10}$ down, the circuit through $M^{10}$ is from terminal X through conductors $I^5$ and $M^8$ to the switch at the top of $M^{10}$, and thence across said switch to the contact at the back of the core of solenoid $O^2$, and thence down to the right of resistance $O^{11}$, so that said resistance is out of circuit, and thence, as before traced, back to terminal Y. This arrangement is similar to that of solenoids M and F. When the core of $M^{10}$ is drawn up, it opens the short circuit around the resistance by means of a switch at the top of solenoid $M^{10}$, and thus cuts down the current through said solenoid. As the core of solenoid $O^2$ reaches the upward limit of its movement it cuts in a resistance $O^6$ in the circuit of the solenoid $O^2$ by means of the switch at the top and at the same time completes the circuit through solenoid $O^2$ by means of the switch associated with the core, so that when the core is up there is a circuit completed through the solenoid $O^2$, by means of which sufficient current passes therethrough to hold the solenoid against accidental dropping.

When it is desired to run the right-hand press at high speed and the left-hand at low speed, the clutch-lever $D'$ is moved to the left and clutch-lever $E'$ moved to the right. This completes the circuit through solenoid $Q'$. The core of said solenoid is then lifted, so as to move the switches $Q^3$ and $Q^2$. The movement of switch $Q^3$ changes the circuit of the push-buttons, so that the push-buttons on the right are associated with the controller on the left—that is, the double controller which controls the large motor A and a small one—while the push-buttons on the left are associated with the controller operated by solenoid $O^2$. The movement of the switch $Q^2$ connects motor C with the controller on the left—that is, with the small motor-controller operated by solenoid F—and at the same time connects the motor B with the controller on the right operated by the solenoid $O^2$.

When it is desired to run the entire press with one small motor and the large motor and arrange the circuits so that the push-buttons of either set control the entire press, the levers $D'$ and $E'$ are moved to the right, so as to close contacts $E^5$ and $E^8$, or if one of them is open $E^2$ is closed on contacts $E^7$. In either event the circuit is completed through solenoid S. The core of said solenoid is then lifted and the switches $S'$ and $S^2$ are moved. The movement of switch $S'$ varies the circuits, so that both sets of push-buttons are associated with the double controller on the left. The two sets of push-buttons are thus placed parallel with each other. These circuits are paralleled at $S^5$, $S^6$, $S^7$, and $S^8$. The on circuit of the controller of solenoid $O^2$ is opened at $S^3$. The off circuit is opened at $S^5$. The quick or emergency stop is opened at $S^4$, and this permanently cuts out the small controller on the right, so that it is inoperative during this period and the motor associated with it cannot under these conditions be run. The movement of switch $S^2$ short-circuits a portion of the resistance for the small motor, and this is done because when the entire press is on this motor the motor is given a heavier starting-load, and hence requires more initial current. If it is desired to run the small motor C on the right in connection with the large motor, the lever $D'$ is moved to the left and lever $E'$ moved to the right, lever $E^2$ being also to the right and being closed. Any other condition of levers $D'$ and $E'$ will cut out small motor C and cut in small motor B, said latter motor then operating with the motor A.

If, for example, the left-hand side of the press is running and it is desired to prevent the speed from being increased, switch 4 on the left is closed. This energizes solenoid $O^{60}$, which lifts its core and opens the on circuit through magnet $G'$. This opens the circuit through the holding-magnet for the large solenoid, and while this circuit is open this position of the core cannot be changed so as to start the motor if stationary or to increase the speed if running, although the core can be drawn up to decrease the speed of the motor. If the switch 8 is closed, it energizes solenoid $O^7$, which lifts its core and breaks the on circuit through the magnet $O^3$, associated with the small controller on the right. When both sets of buttons are in parallel, the operation of either switch 4 or 8 will control the motors then in use. In this latter case both solenoids are energized by one switch. This switch is not a push-button, but an ordinary snap-switch or any switch which remains closed or open.

It will be noted that the solenoid H has several circuits. For example, the circuit which draws its core up when the stop-button 3 is pressed is as follows: from the main X, through conductors $I^5$ and $M^8$, to the switch at the top of solenoid M, thence by conductors $M^6$, $P^2$, and P to terminal Y. When the core of the main solenoid reaches its up position, the circuit which holds the core of solenoid H up is as follows: from terminal X to conductor P', thence through conductors $G^{12}$, $G^9$, and P to terminal Y. When the core of the large solenoid is up, the circuit is completed therethrough, including the resistance at the top, so that a small amount of current can leak through the solenoid, which is sufficient to hold the core up, and hence if for any reason, as by means of jarring or the like, the locking device should be released there is no danger of the core dropping so as to start the motor.

Figs. 17 to 20, inclusive, show an automatic clutch. Connected with the worm $B^4$ is the ratchet $B^5$, loose on the shaft. A hollow casing $B^9$, keyed to the shaft, fits over the ratchet $B^5$ and is provided with pivoted pawls $B^8$. When the slow motor is driving, one or more pawls $B^8$ engage the ratchet $B^5$, so that the shaft D is driven. When the high-speed motor is in operation, the rotation of casing $B^9$ throws the pawls $B^8$ outwardly by centrifugal force to the position shown in Fig. 19, automatically disconnecting the small motor from the shaft.

I claim—

1. The combination with two or more motors of a controlling device adapted to be operated from a distant point and comprising a series of actuating parts adapted to be successively brought into action when the circuit is completed at the distant point and successively start the said motors.

2. The combination with a plurality of motors of a controlling device adapted to be operated by the closing of a single circuit and comprising a series of actuating parts adapted to be successively brought into action to start one motor, to start a second motor and to slow down or stop the first motor when the said circuit is completed.

3. The combination with a plurality of motors of a controlling device adapted to be operated by the closing of a single circuit and comprising a series of actuating parts adapted to be successively brought into action to start one motor; to start a second motor and to slow down or stop the first motor, when the said circuit is completed, and a second circuit connected with said controlling device, which when completed causes the parts to move back to their initial position, first slowing down the second motor, then starting the first motor, then stopping the second motor and then stopping the first motor.

4. The combination with two or more motors of a controlling device adapted to be operated from a distant point and comprising a series of actuating parts adapted to be successively brought into action when the circuit is completed at the distant point and successively start the said motors, and an emergency device associated with said controlling device and adapted when a circuit is closed to break the circuit through all the motors, so as to suddenly stop the apparatus.

5. The combination with two or more motors of a controlling device adapted to be operated from a distant point and comprising a series of actuating parts adapted to be successively brought into action when the circuit is completed at the distant point and successively start the said motors, a second circuit adapted when completed to successively stop the motors, and an emergency device associated with the controlling device and adapted when a circuit is closed to break the circuit through all the motors and suddenly stop the apparatus.

6. The combination with a plurality of motors or a set of resistances and contacts for each motor, a contact device for each set of resistances, a single actuating device for all of said contact devices, a circuit making and breaking device for each motor and connected with said single actuating device, so as to be successively operated thereby.

7. The combination with a plurality of motors of a set of resistances and contacts for each motor, a contact device for each set of resistances, a single actuating device for all of said contact devices, a circuit making and breaking device for each motor and connected with said single actuating device, so as to be successively operated thereby, and a switch adapted when operated to start the operation of the controlling device.

8. A controlling device for a plurality of motors, comprising a set of resistance-contacts and resistances for each motor, a contact device for each set of contacts, a solenoid provided with a core to which all of said contact devices are connected, a separate circuit making and breaking solenoid for each motor, and a switch device actuated by the core of said first solenoid to successively actuate said circuit making and breaking solenoid.

9. A controlling device for motors, comprising a suitable resistance and contacts, a contact device therefor, a solenoid having a core to which said contact device is connected, a holding device for holding said core in a predetermined position, a switch associated with said holding device, a circuit making and breaking device in the circuit of said solenoid, and an electromagnetic controlling device therefor in circuit with said switch.

10. A controlling device for a plurality of motors, comprising a controller for each motor, means for changing the motors from one controller to the other, and a safety device for preventing this change when one controller is in its operative position.

11. A controlling device for a plurality of motors, comprising a series of electromagnetic circuit-controlling devices, a series of sets of switches for operating different devices, and a switch adapted when moved to one position to make the sets of switches independent and when moved to another position to connect them in parallel.

12. A controlling device for two or more motors, comprising a controller for each motor, a push-button at a distant point for operating each controller, a regulating-switch for the push-button circuits and adapted when in one position to render them independent and when in another position to connect them in parallel.

13. A controlling device for two or more motors, comprising a controller for each motor, a push-button at a distant point for operating each controller, a regulating-switch for the push-button circuits and adapted when in one position to render them independent and when in another position to disconnect them from one controller and connect them all with the other controller.

14. A controlling device for two or more motors, comprising a controller proper for each motor, a circuit making and breaking device for each motor, provided with suitable circuit connections, and a circuit-controlling device provided with a controlling-switch which when actuated to close said circuit causes the controllers and circuit making and breaking devices to be successively operated to start the motors.

15. A controlling device for two or more motors, comprising a controller proper for each motor, a circuit making and breaking device for each motor, provided with suitable circuit connections, a circuit-controlling device provided with a controlling-switch, which when actuated to close said circuit causes the controllers and circuit making and breaking devices to be successively operated to start the motors, and a second switch adapted when closed to reverse the operation of the devices.

16. A controlling device for two or more motors, comprising a controller proper for each motor, a circuit making and breaking device for each motor, provided with suitable circuit connections, a circuit-controlling device provided with a controlling-switch, which when actuated to close said circuit causes the controllers and circuit making and breaking devices to be successively operated to start the motors, a second switch adapted when closed to reverse the operation of the devices, and an emergency switch device adapted when actuated to stop the motor or motors before the controllers are returned to their initial or starting position.

17. A controlling device for two or more motors, comprising a controller proper for each motor, a circuit making and breaking device for each motor, provided with suitable circuit connections, a circuit-controlling device provided with a controlling-switch, which when actuated to close said circuit causes the controllers and circuit making and breaking devices to be successively operated to start the motors, a second switch adapted when closed to reverse the operation of the devices, an emergency switch device adapted when actuated to stop the motor or motors before the controllers are returned to their initial or starting position, and means associated with said emergency switch device for returning all the parts to their initial or starting position when the emergency device is actuated.

18. A controlling device for two or more motors, consisting of a controller proper for each motor, an emergency switch device for breaking the circuit through one or both motors, and means associated with said emergency device for returning one or both controllers to their initial or starting position when the emergency device is actuated.

19. A controlling device for two or more motors, consisting of a controller proper for each motor, an emergency switch device for breaking the circuit through one or both motors, and means associated with said emergency device for returning one or both controllers and said emergency switch device to their initial or starting position when the emergency device is actuated.

20. A controlling device for motors, comprising a main solenoid, a series of electromagnetic circuit-controlling devices associated therewith, a switch device associated with the core of said main solenoid, by means of which the circuit relations of said electromagnetic circuit-controlling devices are determined.

21. A controlling device for motors, comprising a series of contacts with resistances associated therewith, a contact device adapted to move over said contacts, a solenoid provided with a core to which said contact device is connected, a locking device for said core, and two switch devices associated with said core and adapted to be oppositely actuated by a movement of said core.

22. A controlling device for motors, comprising a main solenoid, a circuit-controlling electromagnetic device in the circuit thereof, having two different circuits by means of which it may be energized.

23. A controlling device for a plurality of motors, comprising a controller proper for each motor, a switch for changing the relation of the controllers and motors, and a safety device for locking said switch against movement when either of the motors is in operation.

24. A controlling device for a plurality of motors, comprising a controller proper for each motor, a switch for changing the relation of the controllers and motors, and a safety device for locking said switch against movement when either of the motors is in operation, said safety device comprising an electromagnetic device connected in a circuit controlled by a moving part of one or both of said controllers.

25. A controlling device for a plurality of motors, comprising a controller proper for each motor, a switch device for changing the relation of the controllers and motors, comprising an actuating-solenoid, a locking-magnet for the core of said solenoid, and a circuit for said locking-magnet controlled by a moving part of one or both of said controllers.

26. A controlling device for a plurality of motors, comprising a main solenoid controlled from a distant point, a push-button for controlling the same, and a safety-switch for controlling the controlling-circuit of said main solenoid, so as to render said push-button inoperative to start or increase the speed of the motor associated with said main solenoid.

27. A controlling device for motors, comprising a series of contacts with resistance associated therewith, a contact device adapted to move over said contacts, a solenoid provided with a core to which said contact device is connected, a locking device for said core and two switch devices associated with said core so as to be operated by its movement.

28. A controlling device for motors, comprising a resistance device actuated by a controlling-solenoid, and means for completing the circuit through the controlling-solenoid when in its up position, so as to prevent accidental dropping thereof.

29. A controlling device for motors, comprising a resistance device actuated by a controlling-solenoid, means for completing the circuit through the controlling-solenoid when in its up position, so as to prevent accidental dropping thereof, and means for breaking this circuit when it is desired to start the motors.

CHARLES A. DRESSER.

Witnesses:
FANNY B. FAY,
HOMER S. KRAFT.